United States Patent
Gustyakova et al.

(10) Patent No.: US 12,180,308 B2
(45) Date of Patent: Dec. 31, 2024

(54) MODIFIED (CO)POLYMER, METHOD FOR PREPARING THEREOF AND USE OF THE SAME

(71) Applicant: PUBLIC JOINT STOCK COMPANY "SIBUR HOLDING", Tobolsk (RU)

(72) Inventors: Svetlana Igorevna Gustyakova, stanitsa Dinskaya (RU); Egor Evgenievich Popovtsev, g. Seversk (RU)

(73) Assignee: Public Joint Stock Company "Sibur Holding", Tobolsk (RU)

( * ) Notice: Subject to any disclaimer, the term of this patent is extended or adjusted under 35 U.S.C. 154(b) by 717 days.

(21) Appl. No.: 17/418,183

(22) PCT Filed: Dec. 27, 2018

(86) PCT No.: PCT/RU2018/000885
§ 371 (c)(1),
(2) Date: Jun. 24, 2021

(87) PCT Pub. No.: WO2020/139110
PCT Pub. Date: Jul. 2, 2020

(65) Prior Publication Data
US 2022/0106416 A1  Apr. 7, 2022

(51) Int. Cl.
*C08C 19/14* (2006.01)
*C08C 19/06* (2006.01)
*C08J 9/00* (2006.01)
*C08J 9/16* (2006.01)
*C08K 5/05* (2006.01)
*C08L 25/06* (2006.01)

(52) U.S. Cl.
CPC ............. *C08C 19/14* (2013.01); *C08C 19/06* (2013.01); *C08J 9/0061* (2013.01); *C08J 9/16* (2013.01); *C08K 5/05* (2013.01); *C08L 25/06* (2013.01); *C08J 2325/06* (2013.01); *C08J 2415/02* (2013.01); *C08L 2201/02* (2013.01); *C08L 2201/08* (2013.01)

(58) Field of Classification Search
CPC ......... C08C 19/12; C08C 19/14; C08C 19/06; C08C 19/04; C08F 8/06; C08F 8/08; C08F 8/20; C08F 8/22; C08F 36/00; C08F 36/04; C08F 36/06; C08F 36/08
See application file for complete search history.

(56) References Cited

U.S. PATENT DOCUMENTS

| | | | |
|---|---|---|---|
| 5,086,078 A | 2/1992 | Harclerode et al. | |
| 2009/0292079 A1* | 11/2009 | Murray | C08F 8/22 525/355 |
| 2010/0331497 A1* | 12/2010 | Vogel | C08F 8/08 525/418 |

FOREIGN PATENT DOCUMENTS

| | | |
|---|---|---|
| RU | 2414479 C2 | 3/2011 |
| RU | 2530021 C2 | 10/2014 |
| WO | 2008/021417 A2 | 2/2008 |
| WO | 2016/123263 A1 | 8/2016 |

OTHER PUBLICATIONS

Nae, Journal of Polymer Science Part A: Polymer Chemistry, vol. 24, Issue 6, Jun. 1986, pp. 1239-1249. (Year: 1986).*
International Search Report and Written Opinion mailed Oct. 15, 2019, directed to to International Application No. PCT/RU2018/000885; 10 pages.
United Nations Environmental Program (UNEP). "Persistent Organic Pollutants Review Committee Sixth Meeting—Draft risk profile: hexabromocyclododecane," Stockholm Convention on Persistent Organic Pollutants, Oct. 11-15, 2010, Geneva, Switzerland; 42 pages.

* cited by examiner

*Primary Examiner* — Robert C Boyle
(74) *Attorney, Agent, or Firm* — Banner & Witcoff, Ltd.

(57) ABSTRACT

The invention relates to the field of modified diene-containing (co)polymers, in particular, to modified butadiene-styrene copolymers that can be used as flame retardants for polymer compositions based on expandable polystyrene. In particular, the invention relates to a modified diene-containing (co)polymer, a method for preparing thereof and the use of the same as a flame retardant for expandable polystyrene. The modified diene-containing (co)polymer according to the invention is characterized by a high heat resistance, in particular, a 5% weight loss temperature of at least 180° C., a molecular weight of at least 1500 g/mol, and a halogen content of at least 35 wt. % based on the total weight of the (co)polymer.

58 Claims, 2 Drawing Sheets

FIG.2

MODIFIED (CO)POLYMER, METHOD FOR PREPARING THEREOF AND USE OF THE SAME

CROSS REFERENCE TO RELATED APPLICATIONS

This application is a U.S. national stage application under 35 U.S.C. § 371 of International Application No. PCT/RU2018/000885, filed on Dec. 27, 2018, the entire contents of which is incorporated herein by reference.

FIELD OF THE INVENTION

The invention relates to the field of modified diene-containing (co)polymers, in particular a modified butadiene-styrene copolymer that can be used as a flame retardant for polymer compositions based on expandable polystyrene. In particular, the invention relates to a modified diene-containing (co)polymer, a method for preparing thereof and the use of the same as a flame retardant for polystyrene, including expandable polystyrene.

BACKGROUND OF THE INVENTION

Flame retardants are widely used in products made of various polymers and polymer compositions, for example in products made of expandable polystyrene, to provide them with flame retardant properties [Stockholm Convention on Persistent Organic Pollutants, UNEP/POPS/POPRC.6/10, 15.10.2010]. Such polymer compositions usually contain various low molecular weight brominated compounds, for example hexabromocyclododecane (HBCD), used as flame retardants. However, the results of many studies have shown that HBCD has tendency to bioaccumulation and is highly toxic and resistant to environmental factors [Stockholm Convention on Persistent Organic Pollutants, UNEP/POPS/POPRC.6/10, 15.10.2010, Article 4]. This has led to limited use of HBCD as flame retardant in order to reduce ecological risks.

Processing temperatures for some polymer compositions, for example based on expandable polystyrene [Stockholm Convention on Persistent Organic Pollutants, UNEP/POPS/POPRC.6/10, 15.10.2010, Article 74], are often very high and can result in the degradation of a flame retardant during processing a polymer composition. In such a case, polymer compositions lose their flame retardant properties, and decomposition products, such as HBr, are formed. Therefore, it is important that a flame retardant was thermally stable at processing temperatures of polymer materials and met the requirements of non-toxicity and environmental compatibility.

As an alternative of HBCD, more ecologically friendly flame retardants, as compared to HBCD, are known, which are prepared on the basis of diene-containing (co)polymers, in particular, butadiene-styrene copolymers.

Examples of such flame retardants are brominated butadiene-styrene copolymers disclosed in application WO2008021417 and patent RU2414479.

Thus, patent RU2414479 provides a heat-resistant brominated butadiene-styrene copolymer that can be used as a flame retardant in expandable and non-expandable polymer materials. Said brominated butadiene-styrene copolymer is characterized by a content of non-brominated non-aromatic double bonds of less than or equal to 15% based on the content of non-aromatic double bonds in the copolymer before bromination, as determined by $^1$H NMR spectroscopy and a 5% weight loss temperature of at least 200° C., as determined by thermogravimetric analysis (TGA).

Patent RU2414479 also relates to a method for preparing the above-mentioned heat-resistant brominated copolymer, the method comprises:

a) providing a homogeneous reaction solution of copolymer, a brominating agent, in particular tetraalkylammonium tribromide, and a solvent;

b) aging the reaction solution under reaction conditions for a time sufficient for bromination of at least 85% of non-aromatic double bonds comprised in the copolymer;

c) isolating the brominated copolymer by passing a filtrate through silica gel or an ion-exchange resin layer;

d) washing the filtrate with an aqueous solution of sodium hydrogen sulfite to neutralize a non-reacted brominating agent; and e) isolating the brominated (co)polymer by precipitation in methanol.

In addition, patent RU2414479 provides a polymer mixture comprising said heat-resistant brominated butadiene-styrene copolymer and a molded article comprising said polymer mixture.

This flame retardant possesses low thermal stability at high processing temperatures of expandable polystyrene and a limited compatibility of highly brominated butadiene-styrene copolymers, which can make it difficult to obtain a homogeneous structure of expanded polystyrene in large-thickness products made thereof.

There are also flame retardants for expandable polystyrene that are hydroxybrominated butadiene-styrene copolymers, for example, disclosed in application WO2016123263.

The flame retardant according to application WO2016123263 is prepared by reacting butadiene-styrene copolymer with quaternary ammonium tribromide to brominate from 50 to 98% of repeating butadiene units in the starting copolymer, thus obtaining a partially brominated copolymer, and then by reacting the partially brominated copolymer with N-haloimide, for example N-chlorosuccinimide or N-bromosuccinimide, in the presence of water and a water-miscible solvent to halohydrate a part of repeating butadiene units, thus obtaining hydroxybrominated butadiene-styrene copolymer. The resulting hydroxybrominated butadiene-styrene copolymer comprises from 2 to 50 wt. % of butadiene units, which are hydroxybrominated, and from 50 to 98 wt. % of butadiene units, which are brominated, and has a 5% weight loss temperature of at least 250° C.

The described flame retardant has low thermal stability at high processing temperatures of expandable polystyrene and the absence of functional groups capable of absorbing HBr released at high temperatures.

In addition, the method for preparing a flame retardant according to said invention is characterized by large amount of time spent in the step of preparing a hydroxybrominated butadiene-styrene copolymer, and in of the step of its isolation from the reaction mass, and the need to use expensive reagents, in particular, N-haloimide.

Furthermore, the use of a brominated and epoxidized butadiene-styrene copolymer as a flame retardant for expandable polystyrene is known from the prior art (patent RU 2530021).

According to this invention, flame retardant is prepared by a method comprising:

a) epoxidizing a starting butadiene-styrene copolymer having a molecular weight of at least 700 such that at least a part of non-conjugated carbon-carbon double bonds is epoxidized; and b) brominating at least a part of the remaining non-conjugated carbon-carbon double bonds by contacting the butadiene-styrene copolymer epoxidized in step (a) with quaternary ammonium tribromide to obtain a brominated and epoxidized butadiene-styrene copolymer.

The flame retardant obtained according to said invention is characterized by a molecular weight of at least 1500, a bromine content of at least 35 wt. % and a 5% weight loss temperature of at least 180° C.

However, despite the fact that said flame retardant contains epoxy groups capable of absorbing HBr released at high processing temperatures of polymer compositions based on expandable polystyrene, such a flame retardant has a low compatibility with polystyrene, which is confirmed by comparative experiments provided below.

Thus, the known from the prior art flame retardants based on diene-containing (co)polymers and methods for preparing thereof are not efficient enough and also require large economic and time costs.

In this connection, one of the prospective directions is the development of a flame retardant based on diene-containing (co)polymer that would be heat resistant, would meet requirements of environmental friendliness, would not affect the process of polymerization and the formation of polystyrene granules, and would provide polystyrene, including expandable polystyrene, with excellent flame retardant properties.

SUMMARY OF THE INVENTION

The objective of the present invention is to develop a modified diene-containing (co)polymer that can be used as a flame retardant for expandable polystyrene and a method for preparing thereof.

The prepared modified diene-containing (co)polymers are characterized by a high heat resistance, in particular, a 5% weight loss temperature of at least 180° C.; a molecular weight of at least 1500 g/mol and a halogen content of at least 35 wt. % based on the total weight of the (co)polymer and do not affect the process of polymerization and the formation of polystyrene granules.

This technical objective is addressed and the technical result is achieved by preparing a modified diene-containing (co)polymer containing epoxy groups, hydroxyl groups, and halogen atoms, wherein the modified diene-containing (co) polymer can be prepared by reacting a starting diene-containing (co)polymer with a modifying system comprising halogen and water, in the presence of an aliphatic alcohol.

The inventors have found that a modified diene-containing (co)polymer comprising epoxy groups, hydroxyl groups, and halogen atoms are heat resistant and does not affect the process of polymerization and the formation of polystyrene granules.

In addition, the inventors have found that said modified diene-containing (co)polymer can be prepared by using, as a modifying system, a mixture of halogen and water in the presence of an aliphatic alcohol. The modifying system enables hydroxyl groups and halogen atoms to be introduced into the structure of a starting (co)polymer, followed by partial dehydrohalogenation to form epoxy groups in the (co)polymer structure.

The present invention provides a modified diene-containing (co)polymer comprising epoxy and hydroxyl groups and halogen atoms, wherein the (co)polymer can be used as a flame retardant in various polymer compositions, for example based on polystyrene, including expandable polystyrene.

BRIEF DESCRIPTION OF THE FIGURES

FIG. 1 and FIG. 2 are intended to clarify the technical solutions disclosing the essence of the present invention.

DETAILED DESCRIPTION OF THE INVENTION

A detailed description of various aspects of the embodiments of the present invention is provided below.

According to the present invention, the prepared modified diene-containing (co)polymer is a heat resistant modified diene-containing (co)polymer that is characterized by a weight-average molecular weight of at least 1500 g/mol, preferably from 2000 to 280000 g/mol, more preferably from 10000 to 150000 g/mol, most preferably from 60000 to 100000 g/mol, and multiple non-conjugated carbon-carbon double bonds, wherein at least two of them (but less than all non-conjugated carbon-carbon double bonds) are subjected to modification, and wherein the modified diene-containing (co)polymer comprises at least 35 wt. %, preferably at least 60 wt. %, and more preferably at least 75 wt. % of halogen based on the total weight of the (co)polymer, and at least one epoxidized non-conjugated carbon-carbon double bond and at least one hydroxyhalogenated non-conjugated carbon-carbon double bond.

The term "heat resistance" as used herein means a 5% weight loss temperature of the modified diene-containing (co)polymer, as measured by thermogravimetric analysis (TGA) described below.

The prepared heat resistant modified diene-containing (co)polymer comprises at least one epoxy group, wherein the content of epoxy groups in the modified diene-containing (co)polymer is from 0.01 to 5 wt. %, preferably from 0.05 to 3 wt. %, and more preferably from 1 to 2 wt. % based on the total weight of the (co)polymer.

The resulting heat resistant modified diene-containing (co)polymer comprises at least one hydroxyl group, wherein the content of hydroxyl groups in the resulting modified diene-containing (co)polymer is from 0.05 to 5 wt. %, preferably from 0.1 to 3 wt. %, and more preferably from 0.15 to 1 wt. % based on the total weight of the (co)polymer.

The presence of two types of functional groups, in addition to halogen atoms, in the modified diene-containing (co)polymer makes it possible to solve several problems, namely, epoxy groups function as HBr absorbers that, as mentioned above, can be released during the processing of polymers and polymer compositions containing a flame retardant, at elevated temperatures. In turn, the hydroxyl groups impart polarity and hydrophilicity to the (co)polymer.

As a result, the addition of a flame retardant to the process of suspension polymerization of styrene ensures a stable suspension, the polymerization process proceeds without deviation due to the complex effect of three types of functional groups, namely, an epoxy group, a hydroxyl group and halogen atoms simultaneously present in the (co)polymer. This leads to a better distribution of the flame retardant in suspension during the suspension polymerization of styrene, which allows to obtain a particle-size distribution of polystyrene that meets the requirements of consumers.

Accordingly, a 5% weight loss temperature of the modified diene-containing (co)polymer is at least 180° C., preferably at least 200° C., more preferably at least 220° C.

An example of the modified diene-containing (co)polymer prepared according to the present invention is, but is not limited to, a modified diene-containing (co)polymer of general formula (1):

(1)

wherein $R_1$ to $R_3$ are the same or different and can be hydrogen or a hydrocarbon group comprising 1 to 6 carbon atoms, for example an alkyl group; Hal is halogen that is selected from chlorine, bromine and iodine; k, m, l, and p can be the same or different and can be $1<k<37$, $0<m<19$, $2<(1+p)<3660$, more preferably $6<k<12$, $3<m<6$, $610<(1+p)<1220$, and most preferably $7<k<10$, $4<m<5$, $730<(1+p)<980$, and n is the number of units in a polymer chain, wherein $50<n<450$, preferably $100<n<350$, and more preferably $140<n<250$.

According to the present invention, a modified diene-containing (co)polymer is prepared using a modifying system, which is a mixture of halogen and water in the presence of an aliphatic alcohol.

Starting diene-containing copolymers can be polymers and copolymers of conjugated dienes.

In another embodiment, the present invention provides a method for preparing a modified diene-containing (co)polymer, the method comprising the steps of:

a) dissolution: (optionally) pre-grinding of a starting diene-containing (co)polymer, followed by dissolution in an organic solvent;

b) modification: adding components of a modifying system to the solution of the starting diene-containing (co)polymer in the organic solvent, obtained in step (a);

c) neutralization and separation: adding an aqueous solution of a neutralizing agent to the reaction mass obtained in step (b), and separating an aqueous layer and an organic layer;

d) precipitation: precipitating the modified diene-containing (co)polymer by adding an excess of an alcohol-precipitant to the organic layer; and e) isolation: filtrating and then drying the precipitated modified diene-containing (co)polymer, wherein the method is characterized in that in modification step (b), the used modifying agent is a mixture of halogen and water at a molar ratio of halogen to water of from 1:0.01 to 1:1, preferably from 1:0.5 to 1:0.7, more preferably from 1:0.25 to 1:0.7 based on the total number of double bonds.

Dissolution Step a):

In this step, the starting diene-containing (co)polymer is optionally pre-ground and then dissolved in an organic solvent with stirring.

The starting diene-containing (co)polymers can be conjugated diene polymers or copolymers.

Suitable conjugated dienes are conjugated dines comprising 4 to 12 carbon atoms, for example, 1,3-butadiene, 2-methyl-1,3-butadiene (isoprene), 2-ethyl-1,3-butadiene, 2,3-di($C_1$-$C_5$ alkyl)-1,3-butadienes, such as 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, 2-methyl-pentadiene, 4-methyl-pentadiene, or mixtures thereof, and the like. 1,3-Butadiene or isoprene are preferable.

Suitable comonomers in the starting diene-containing (co)polymer are vinyl aromatic compounds, such as styrene, α-methyl styrene, ortho-, meta- and para-methyl styrene, 3-vinyl toluene, ethylvinyl benzene, 4-cyclohexyl styrene, para-tert-butyl styrene, methoxystyrenes, vinyl mesitylene, divinyl benzene, 1-vinyl naphthalene, 2,4,6-trimethyl styrene, and the like, or mixtures thereof. Styrene or α-methyl styrene are preferable.

Suitable conjugated diene-polymers and copolymers comprise at least 30 wt. %, preferably at least 50 wt. %, and more preferably 70 wt. % of polymerized conjugated diene units.

Preferable (co)polymers used as the diene-containing (co)polymer are, for example, butadiene, butadiene-styrene, and butadiene-styrene-isoprene (co)polymers, wherein a butadiene-styrene copolymer, which can be a di- or triblock copolymer of styrene and butadiene, is most preferable.

Examples of commercially available diene-containing (co)polymers include, but are not limited to, butadiene polymers known under the trade names BR-1243 Nd, grade B (LP), BR-1243 Nd, grade B, and BR-1243 ND HV; butadiene-styrene block copolymers known under the trade names DST R 30-00, SBS L 30-01A, SBS R 30-00A, DST L 30-01, and DST L 30-01 (SR); and a butadiene-styrene copolymer prepared by the method of solution polymerization, known under the trade names: DSSK-2560-M27 (grade AA), DSSK-2560-M27 BB (grade A), DSSK-4040-M27 (grade A), produced by PJC "SIBUR-Holding".

Suitable starting diene-containing (co)polymers have a weight-average molecular weight of at least 700 g/mol, preferably from 1000 to 400000 g/mol, more preferably from 2000 to 300000 g/mol, more preferably from 5000 to 200000 g/mol, more preferably from 20000 to 120000 g/mol, and most preferably from 20000 to 50000 g/mol, with a polydispersity index of from 0.8 to 3, more preferably from 1 to 1.8, and most preferably from 1.1 to 1.5, with the number of 1,2-units of at least from 10 to 100 wt. %, preferably at least from 50 to 99 wt. %, and more preferably from 60 to 80 wt. % per polybutadiene part of the (co)polymer.

The starting diene-containing (co)polymer is optionally ground by any method known from the prior art, for example, using (knife, hummer, or rotor) grinders, (fluid or screw) millers, etc.

The starting diene-containing (co)polymer when dissolved is stirred by any method known from the prior art, for example, using a device equipped with a mixer or a static mixer at a temperature of from 10 to 50° C., preferably from 15 to 40° C., and more preferably from 20 to 30° C.

Suitable solvents are, but are not limited to, organic solvents that preferably have a purity of 99% and more and are ethers, for example, tetrahydrofuran; halogenated saturated aliphatic hydrocarbons, for example, carbon tetrachloride, chloroform, dibromomethane, dichloromethane, 1,2-dichloroethane; cycloaliphatic hydrocarbons, for example, cyclohexane; aromatic hydrocarbons, for example, toluene; halogenated hydrocarbons, for example, bromobenzene, chlorobenzene, and dichlorobenzene. Preferable organic solvents are solvents which are liquid under conditions of the modification of the starting diene-containing (co)polymer and do not react with the modifying system or the starting (co)polymer. Tetrahydrofuran, chloroform, dichloromethane, dichloroethane, cyclohexane, and toluene are preferred as the solvent, wherein tetrahydrofuran, chloroform, and dichloromethane are most preferable.

The weight ratio of the organic solvent to the starting diene-containing (co)polymer is from 5:1 to 30:1, preferably from 8:1 to 20:1, and more preferably from 10:1 to 15:1.

The time of the dissolution process is at most 60 min, at most 50 min, at most 40 min, at most 30 min, at most 25 min, at most 20 min, at most 15 min, at most 13 min, at most 11 min, at most 9 min, at most 7 min, or at most 5 min.

The mass obtained in the above-mentioned dissolution step is a solution of the starting diene-containing (co)polymer in an organic solvent.

Modification Step b):

In modification step (b), the components of a modifying system are added to the solution of the starting diene-containing (co)polymer obtained in step (a).

According to the present invention, the modifying system consists of halogen and water in the presence of an aliphatic alcohol at a molar ratio of halogen to water of from 1:0.01 to 1:1, preferably from 1:0.5 to 1:0.7, and more preferably from 1:0.25 to 1:0.7 based on the total number of double bonds.

The halogen is chlorine, bromine, or iodine in the form of an elemental compound as such or in the form of a solution in an organic solvent.

The halogen is preferably elemental bromine ($Br_2$) as such or its solution in an organic solvent with a bromine amount of at most 70 wt. %, more preferably at most 60 wt. %, and most preferably at most 50 wt. %.

In the context of the present invention, water is, but is not limited to, distilled, deionized, demineralized, osmotic, or bidistilled water.

The used aliphatic alcohol can be, but is not limited to an alcohol containing 1 to 6 carbon atoms, such as, methanol, ethanol, propanol, isopropanol, butanol, isobutanol, pentanol, or hexanol. Propanol, butanol, isobutanol, and pentanol are preferred as the aliphatic alcohol, wherein butanol, isobutanol, and pentanol are more preferable.

The molar ratio of the starting diene-containing (co)polymer to the modifying system and the aliphatic alcohol is from 1:1.5:3 to 1:5:3, more preferably from 1:2:3 to 1:4:3, and most preferably from 1:2.5:3 to 1:3:3.

The components of the modifying system and the aliphatic alcohol are added to the solution of the starting diene-containing (co)polymer in any order. It is preferably to add first the aliphatic alcohol to the solution of the starting diene-containing (co)polymer, and then to add water and halogen or its solution, or vice versa.

Halogen is preferably added in the form of its solution in an organic solvent by dosing the solution to the reaction mass. Halogen can be dissolved in the organic solvent or a mixture of organic solvents that preferably have a purity of 99% and more and are ethers, for example, tetrahydrofuran; halogenated saturated aliphatic hydrocarbons, for example, chloroform, dibromomethane, dichloromethane, or 1,2-dichloroethane; cycloaliphatic hydrocarbons, for example, cyclohexane; aromatic hydrocarbons, for example, toluene; halogenated aromatic hydrocarbons, for example, bromobenzene, chlorobenzene, and dichlorobenzene. Halogen is preferably dosed in the form of a solution in the same solvent that was used in step (a) to dissolve the starting diene-containing (co)polymer.

The halogen can also be dosed to the reaction mass in the form of a solution in the organic solvent defined above after premixing such a solution with water.

The rate of dosing the halogen solution or a mixture of the halogen solution with water is from 0.80 to 50 ml/min, preferably from 1 to 10 ml/min, and more preferably from 1.5 to 5 ml/min A very high dosing rate leads to local overheating of the reaction mass, an increase in its viscosity, which in turn can result in a modified diene-containing (co)polymer with a low content (less than 35 wt. %) of halogen atoms.

A single addition of the entire volume of the halogen solution to a solution of the starting diene-containing (co)polymer can lead to its crosslinking, local overheating of the reaction mass, and an increase in the viscosity of the reaction mass, which can also result in a modified diene-containing (co)polymer with a low content (less than 35 wt. %) of halogen atoms.

The modification step is carried out in any batch or continuous process equipment known from the prior art. Suitable equipment is, but is not limited to, a continuous stirred tank reactor, a batch stirred tank reactor, and autoclave with a mixer, which are designed to work with highly corrosive environments.

The modification step of the starting diene-containing (co)polymer is preferably carried out without exposure to light, for example, the modification process is carried out in dark glass vessels, in a foil-wrapped reactor, or in a metal reactor, in order to reduce the possibility of non-selective photocatalytic halogenation reactions.

The modification step is carried out at a temperature of from 0 to 50° C., preferably from 20 to 45° C., and more preferably from 30 to 40° C., under atmospheric pressure.

The rate of stirring of the reaction mass after addition of the modifying system is from 50 to 600 rpm, preferably from 100 to 500 rpm, more preferably from 200 to 300 rpm.

The modification step can be carried out for any time sufficient to achieve a desired modification level of the starting diene-containing (co)polymer disclosed above. The time of the modification step is preferably at least 15 min, at least 20 min, at least 25 min, at least 30 min, at least 45 min, at least 60 min, or at least 120 min.

The reaction mass obtained after modification step (b) comprises the target product, which is a modified diene-containing (co)polymer.

Neutralization and Separation Step (c):

This step comprises neutralization of the reaction mass obtained in step (b), which comprises a modified diene-containing (co)polymer, by adding a solution of a neutralizing agent, followed by washing the neutralized reaction mass with water and separating the aqueous layer and the organic layer comprising the modified diene-containing (co)polymer.

The neutralizing agent can be, but is not limited to, an aqueous solution of a base known from the prior art, for example, sodium hydroxide, sodium thiosulfate, sodium bisulfite, sodium carbonate or the like. It is preferably to use an aqueous solution of sodium hydroxide.

The molar ratio of the neutralizing agent to the added halogen is usually from 1:1 to 3:1, preferably from 1:1 to 2:1, and more preferably 1:1.

The neutralization process is preferably carried out at a temperature of from 15 to 50° C., preferably from 20 to 40° C., and more preferably from 25 to 30° C., under atmospheric pressure.

The washing with water is carried out with at least one-fold, preferably two-fold, and more preferably three-fold volume excess of water relative to the volume of the reaction mass subjected to neutralization, resulting in the separation of the reaction mass into two layers: an organic layer comprising a modified diene-containing (co)polymer and an aqueous layer.

The organic and aqueous layers are separated by any prior art equipment, for example, using a funnel, a separator, or a gravity tank.

Precipitation Step (d):

The modified diene-containing (co)polymer obtained in step (b) is precipitated by adding an alcohol-precipitant to the organic layer obtained in step (c), containing the modified diene-containing (co)polymer. The weight ratio of the alcohol-precipitant to the modified diene-containing (co)polymer is from 15:1 to 1:1, preferably from 10:1 to 3:1, and more preferably from 5:1 to 4:1.

Suitable alcohol-precipitants are, but are not limited to, aliphatic alcohols containing from 1 to 4 carbon atoms. Examples of such alcohols are, but are not limited to, methanol, ethanol, propanol, isopropanol, butanol, and isobutanol. Methanol and ethanol are preferred as the alcohol-precipitant.

Isolation Step (e):

In isolation step (e), the modified diene-containing (co)polymer is purified from the residues of the solvent and alcohol-precipitant by filtration in any devices known from the prior art, for example, in porous membrane filters, nutsch filters, etc.

The filtration of the modified diene-containing (co)polymer is carried out at a temperature of from 20 to 40° C., inclusive.

Water and/or water vapor and a solvent and/or solvent vapor are removed from the modified diene-containing (co)polymer by drying said (co)polymer. The drying process of the modified diene-containing (co)polymer may be carried out by physical methods usually used for separation and purification of organic compounds (removal of a solvent under reduced pressure, vacuum drying, etc.) and by using drying agents that remove moisture by adsorption, formation of hydrates or chemical reactions with water and solvents.

The drying is preferably carried out at a temperature of from 50 to 105° C. and under a pressure of from 1 to 20 kPa.

Figure 1:
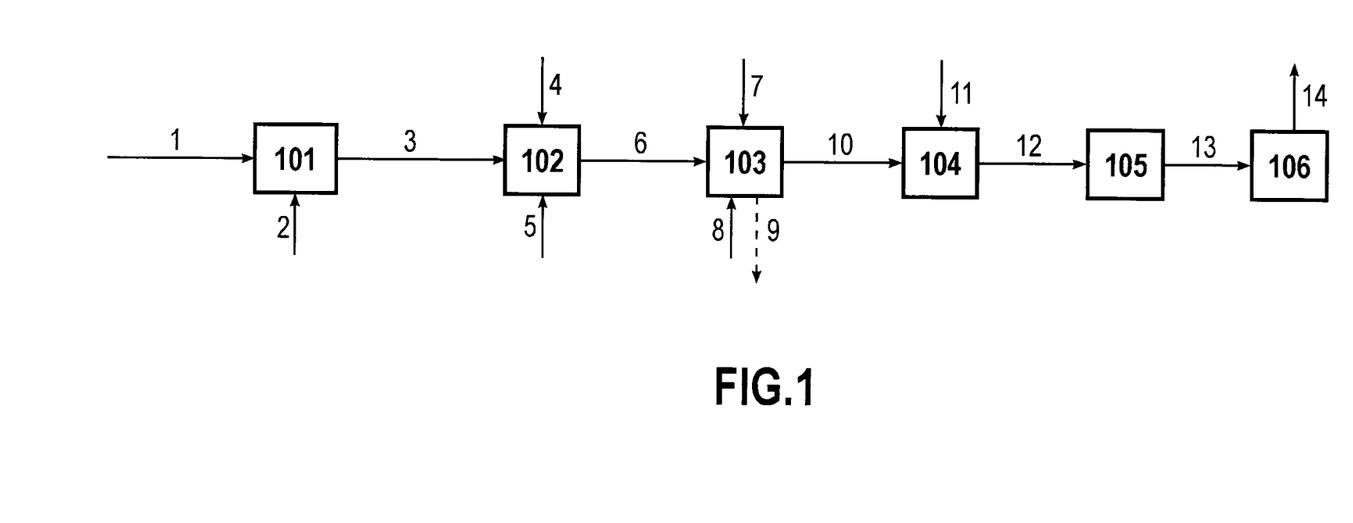
FIG. 1 is a flowchart that shows the sequence of steps for preparing the modified diene-containing (co)polymer according to the present invention.

The invention is clarified in FIG. 1 that shows a flowchart of preparing a modified diene-containing (co)polymer, wherein 101 is a unit for the dissolution of a starting diene-containing (co)polymer, 102 is a unit for the modification of the starting diene-containing (co)polymer, 103 is a unit for neutralization and separation, 104 is a unit for precipitation, 105 is a unit for filtration, and 106 is a unit for drying.

According to the presented method, a starting diene-containing (co)polymer (1), which is optionally ground, is delivered to dissolution unit 101 where it is mixed with an organic solvent (2) to obtain a solution of the starting diene-containing (co)polymer (3). Further, said (co)polymer solution (3) is delivered to modification unit 102 that is also charged with a modifying system (4) and an aliphatic alcohol (5). After that, the modified diene-containing (co)polymer (6) obtained in unit 102 is delivered to neutralization unit 103 that is charged with a neutralizing agent (7) and then with water (8) for washing the neutralized reaction mass, followed by separating an organic layer (10) comprising the modified diene-containing (co)polymer and an aqueous layer (9). Then, the organic layer (10) comprising the modified diene-containing (co)polymer is delivered to precipitation unit 104 that is also charged with an alcohol-precipitant (11) to precipitate the modified diene-containing (co)polymer. Further, the precipitated modified diene-containing (co)polymer (12) is sequentially (12, 13) delivered to filtration unit 105 and drying unit 106 to obtain the resulting product, which is a modified diene-containing (co)polymer (14). The method for preparing a modified diene-containing (co)polymer can comprise a unit of regeneration of the organic solvent that is further recycled to unit 101 of dissolving the starting diene-containing (co)polymer (not shown in FIG. 1).

The flowchart in FIG. 1 is an example of the present invention and is not intended to limit said invention.

The modified diene-containing (co)polymers prepared according to the present invention can be used as flame retardants in various polymers and polymer compositions, for example based on expandable polystyrene, to provide them with flame retardant properties. In addition, flame retardants should be compatible with polymer or a polymer composition.

According to the present invention, the modified diene-containing (co)polymer is added to polymer or a polymer composition in the step of preparation. Thus, for example, the modified diene-containing (co)polymer is introduced into expandable polystyrene in the step of preparing thereof by a method comprising preparing polystyrene by polymerizing styrene in the presence of a polymerization initiator, a polymerization stabilizer, etc., followed by expanding the prepared polystyrene (see, for example, U.S. Pat. No. 5,086,078).

In this case, the content of the modified diene-containing (co)polymer used as a flame retardant should not be lower than 0.5 weight part, preferably not lower than 0.7 weight part, and more preferably not lower than 1 weight part per 100 weight parts of the polymer, otherwise, the efficiency of improving the flame retardant characteristics of the prepared polymer or polymer composition, in particular expandable polystyrene or a composition based thereon, is reduced.

In addition, polymer compositions, for example, based on expandable polystyrene according to the present invention can also include usual additives ensuring a desired complex of technological, physicomechanical, and operational characteristics, for example, antistatics, stabilizers, dyes, lubricants, fillers, adhesion reducing agents, etc.

According to the present invention, compositions based on expandable polystyrene can be used for the production of a large variety of products, such as constructive heat- and sound-insulators, in particular, heat- and sound insulation boards, permanent forms, car components, floatable articles, as well as raw materials for polystyrene foam blocks required in the construction of roads and bridges, and packing domestic appliances.

The modified diene-containing (co)polymer prepared according to the present invention can be used as a flame retardant in expandable polystyrene since this (co)polymer is characterized by high heat resistance, in particular, a 5% weight loss temperature of at least 180° C. measured by thermogravimetric analysis, does not affect the process of polymerization and the process of the formation of polymer, in particular, polystyrene granules, which is confirmed by the particle size distribution of the prepared polystyrene. In addition, the flame retardant prepared according to the present invention provides expandable polystyrene with flame retardant properties, which allows the expandable polystyrene comprising the flame retardant according to the claimed invention to be classified to moderately flammable materials of the inflammability class B2 (according to Item 7 of Article 13 of "Technical regulations of fire safety requirements" (Federal Act of 22.07.2008, No. 123, in the edition of 29.07.2017).

The present invention is described in detail in the examples below. These examples are given only as illustration of the present invention and are not intended to limit the scope present invention.

EMBODIMENTS OF THE INVENTION

Methods of Testing a Modified (Co)Polymer
Thermogravimetric Analysis (TGA)

A 5% weight loss temperature of a modified diene-containing (co)polymer was measured to determine its heat resistance by studying the thermal behavior of a sample(s) of the (co)polymer by a method of simultaneous thermal analysis (STA) (combined methods of differential scanning calorimetry (DSC) and thermogravimetry (TG)) according to ISO11358 by using a STA 449 Jupiter NETZSCH device.

Experimental conditions: inert atmosphere (argon) at a temperature in the range from 30° C. to 600° C., a heating rate of 10° C./min.

Nuclear Magnetic Resonance Method (NMR)

The polymer chain microstructure of a modified diene-containing (co)polymer was determined by NMR spectroscopy on hydrogen nuclei ($^1H$) using a Bruker Avance III device (400 MHz). A solution was prepared by dissolving a 30 mg sample in 0.6 ml of deuterated chloroform. The number of scans on $^1H$ nuclei was equal to 32.

Gel Permeation Chromatography (GPC)

Molecular-weight characteristics of the samples of a starting diene-containing (co)polymer and modified diene-containing (co)polymer were measured by low-temperature GPC according to ISO16014-3 in Agilent 1200 liquid chromatography system with a refractometric detector.

Analysis conditions: eluent—tetrahydrofuran; temperature of dissolution and measurement—40° C.; eluent flow rate: 1.0 ml/min; column: PLgel Mixed-C (2-3 items). The calculation was made according to relative calibration of polystyrene standards (EasiVial PS-H 4 ml, Agilent Technologies) using the Mark-Houwink constants for the (co)polymer, $K=0.000374$, $\alpha=0.699$ Particle-Size Distribution of Polystyrene The particle-size distribution of polystyrene powder was measured using a test sieve shaker HAVER EML digital plus. The used test sieves had diameters of: 2.0; 1.6; 1.0; 0.70; 0.40; and 0.20 mm. The time of sieving was 15 min. The weight of powder on sieves was measured by the gravimetric method.

Flame-Resistance Test

Flame resistance of the samples of expandable polystyrene comprising a flame retardant was determined according to TT 2214-019-53505711-2010.

Preparation of a sample: 40 mm were cut from a molded item and discarded. Then, 5 samples were cut with dimensions $(190\pm1)\times(90\pm0.5)\times(20.0\pm0.5)$ mm so that a technological film, cracks, chips, and open bubbles didn't form during the block formation. The bottom face of the samples should be cut smoothly with sharp edges and should form right angles with side faces.

The method is based on the determination of the flame height of a burning sample for 20 seconds after the removal of the source of fire.

Preparation for Testing:

The device was prepared and set into the operational mode. The ventilation in a chamber was turned off. The air velocity was measured with a thermal anemometer in the exhaust tube of the test chamber. The required value was from 0.5 to 0.8 m/s.

Before testing, the samples were conditioned for at least 14 days at a temperature of $(23\pm5°)$ C. and a relative air humidity of $(50\pm20)\%$ to constant weight.

Further, a mark was placed on the sample at a distance of 150 mm from the lower edge on the front and back faces. Then the samples were vertically hooked in the burning chamber to keep the measuring mark upward, and the bottom face was positioned in the same plane with the mark of the rack holder. Then the holder with the sample was vertically moved so that the stabilizer nozzle for flame exposure touched along the bottom face of the sample.

Then the burner was ignited, and the flame was adjusted using a template held from the side so that the height of the flame with a yellow glow was $(20\pm1)$ mm. The height of the flame was checked before each exposure of the flame to the sample.

At the bottom of the test chamber, filter paper was placed under the sample in a wire box in 2 layers.

Testing:

The burning chamber was closed. A flaming burner turned at an angle of 45° was drawn sideways to the center of the free end (face) of the sample, after which a stopwatch was started. The sample was exposed to flame for 15 seconds, and then the burner was removed, and the burning of the sample was observed. At the same time, the time from the beginning of the flame exposure to the moment when the top of the flame of the burning sample reached the measuring mark of 150 mm was measured, if before this the flame did not extinguish by itself. The tests were interrupted after 20 seconds (from the beginning of the process of treating the sample with a flame), and the maximum flame height and dripping (falling out of burning fragments) were estimated.

The test was considered completed if for each of 5 tested samples, the flame tip of a burning sample does not exceed the measuring mark before the $20^{th}$ second expires and if burning drops when fallen (falling out of burning fragments) burn on the filter paper no more than 2 seconds without burning the filter paper.

Example 1. Preparation of a Modified Diene-Containing Copolymer

A solution of a starting styrene-butadiene copolymer in dichloromethane (10 g of copolymer per 150 g of dichloromethane) was added to a 250-ml dark glass flask. Then, 30 g of butanol and 7.6 g of water were added to the flask, after which a solution of 17.74 g of bromine in 20 ml of dichloromethane was dosed. The modification reaction was conducted for 30 to 40 minutes. After the reaction was complete, a solution of sodium hydroxide (NaOH) was added to the flask, and neutralization was carried out for 1 hour. Then, the reaction mass comprising a modified diene-containing copolymer was washed with a three-fold volume excess of water.

The resulting modified diene-containing copolymer was further filtered, then precipitated in isopropanol, dried by distilling off the solvent at a temperature of 30 to 95° C. under a pressure of 3 kPa, and further dried in a vacuum oven at 70° C. under 0.5 kPa.

The characteristics of the modified diene-containing (co)polymer prepared according to Example 1 are shown in Table 1.

Figure 2:
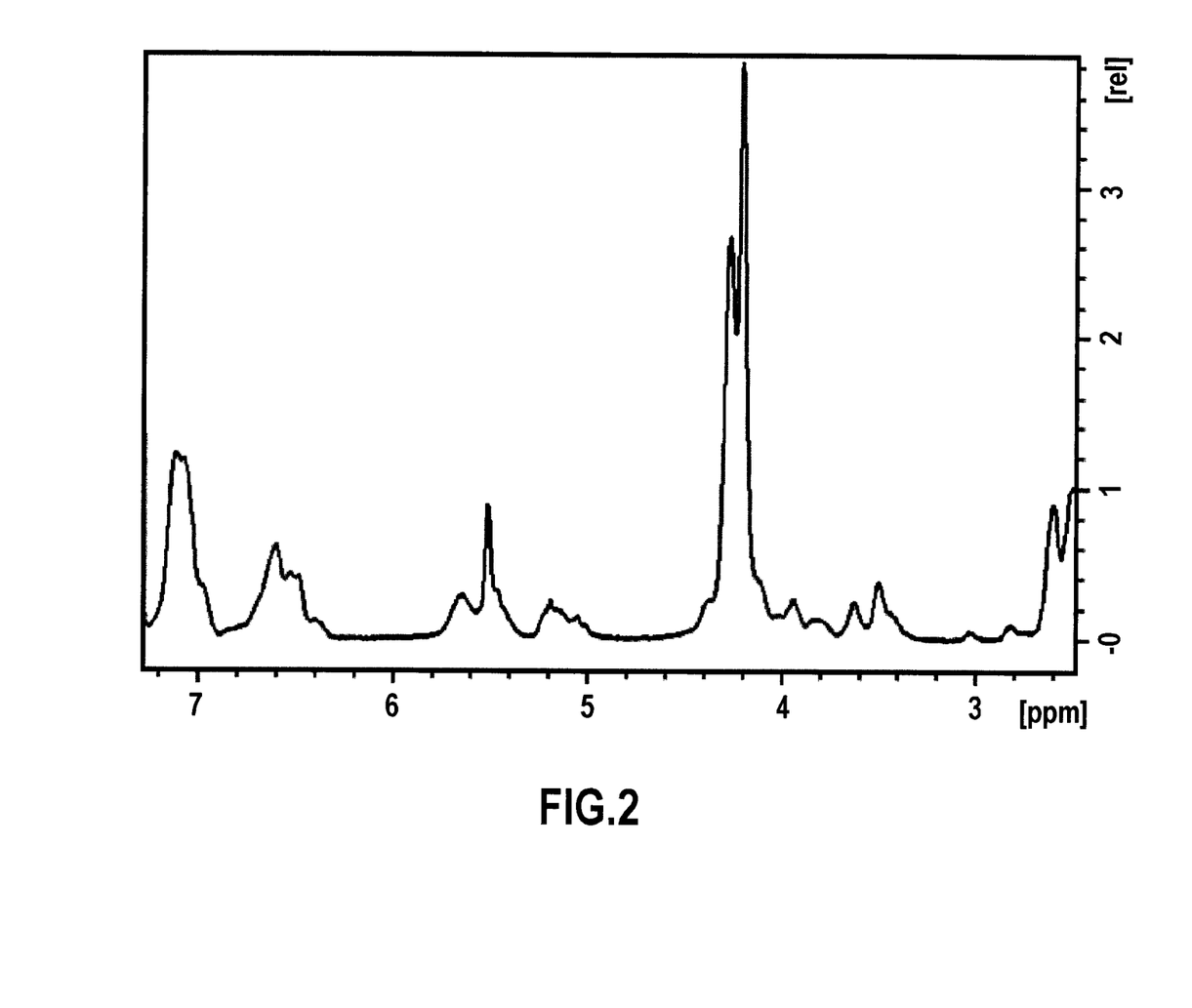
FIG. 2 is the $^1$H NMR spectrum of the resulting modified diene-containing (co)polymer containing epoxy groups, hydroxyl groups, and halogen atoms.

$^1$H NMR spectrum of the prepared modified butadiene-styrene copolymer is shown in FIG. 2.

$^1$H NMR spectrum (CDCl$_3$, δ, ppm): 6.6-7.1 (styrene); 5.6 (1,4-butadiene); 5.1 (1,2-butadiene); 3.8-4.2 (brominated butadienes); 3.6 (hydroxyl groups); 3.5 (tertiary bromides); 2.8-3.0 (epoxy groups).

Example 2. Preparation of a Hydroxybrominated Copolymer According to RU2530021

A solution of a starting butadiene-styrene copolymer (20 g in 200 g of dichloromethane) was cooled with stirring to a temperature of from 0 to 5° C. A 77% solution of m-chloroperbenzoic acid in dichloromethane (1 mol of acid per 1 mol of epoxidized diene units) in an amount of 0.083 g was dosed to the cooled copolymer solution. The temperature of the cooling bath was maintained at 0 to 5° C. After addition of the entire amount of the acid, the reaction mass was stirred at this temperature for additional 30 min, then at 25° C. for 1 hour, and then at 50° C. for additional 1 hour. After epoxidation, the residues of m-chloroperbenzoic acid were neutralized with a solution of sodium hydroxide, and the reaction mass was washed with a three-fold volume excess of water, followed by separation of an aqueous layer and an organic layer.

Further, 60 g of butanol and 5 g of water were added to a dark glass flask, and a solution of bromine in dichloromethane (39.4 of bromine per 50 ml of dichloromethane) were dosed thereto for 10-20 min After the addition of the entire solution of bromine in dichloromethane, the stirring was continued for 30 min, then a 10% solution of sodium thiosulfate was added, and bromine was neutralized for 60 min. After that, the aqueous layer was discharged, and the organic layer was washed with a three-fold volume excess of distilled water. Then, the resulting modified butadiene-styrene copolymer comprising hydroxyl groups and bromine atoms was precipitated in five-fold volume excess of an alcohol, then separated, dried by distilling off the solvent at a temperature of 91° C. under 10 kPa, and further dried in a vacuum oven at 70° C. under 0.5 kPa.

The characteristics of the product prepared in Example 2 are shown in Table 1.

Example 3. Preparation of an Epoxybrominated Copolymer According to RU2530021

A solution of a starting butadiene-styrene copolymer (10 g in 100 g of dichloromethane) was cooled with stirring to 0 to 5° C. 1.32 g of a 77% solution of m-chloroperbenzoic acid in dichloromethane (1 mol of peroxide per 1 mol of diene units to be epoxidized) were dosed to the cooled polymer solution. The temperature of the cooling bath was maintained at 0 to 5° C. After addition of the entire volume of acid, the reaction mass was stirred at this temperature for additional 30 min, then at 25° C. for 1 hour, and then at 50° C. for additional 1 hour. After epoxidation, the residues of m-chloroperbenzoic acid were neutralized with a solution of sodium hydroxide, and the reaction mass was washed with a three-fold volume excess of water, followed by separation of an aqueous layer and an organic layer. Further, water and the solvent were distilled off from the epoxidized butadiene-styrene (co)polymer at 91° C. under 9 kPa, and then dried in a vacuum oven at 91° C. under 9 kPa.

A solution of tetrabutylammonium in dichloromethane (36.13 g of tetrabutylammonium per 20 ml of dichloromethane) was added to a dark glass flask, and a bromine solution in dichloromethane (17.9 g of bromine per 20 ml of dichloromethane) was dosed for 10-20 min After addition of the entire volume of bromine solution in dichloromethane, the stirring was continued for 30 min, then a 10% solution of sodium thiosulfate was added, and bromine was neutralized for 60 min. After that, the aqueous layer was discharged, the organic layer was washed with a three-fold volume excess of distilled water. Then the resulting modified butadiene-styrene copolymer comprising epoxy groups and bromine atoms was precipitated in a five-fold volume excess of alcohol, separated, then dried by distilling off of the solvent at 91° C. under 10 kPa, and further dried in a vacuum oven at 70° C. under 0.5 kPa.

The characteristics of the product prepared in Example 3 are shown in Table 1.

Example 4. Preparation of a Modified Diene-Containing Copolymer with a Reduced Content of Water in the Modifying System The process was carried as disclosed in Example 1, except for addition of 5.1 g of water to the flask.

The characteristics of the product prepared in Example 4 are shown in Table 1.

Example 5. Preparation of a Modified Diene-Containing Copolymer without Water in the Modifying System (Comparative)

The process was carried as disclosed in Example 1, except for the fact that water was not added to the flask.

The characteristics of the product prepared in Example 5 are shown in Table 1.

TABLE 1

Characteristics of modified diene-containing (co)polymers

| Example, No. | Ratio of bromine to non-aromatic double bonds of diene units | Ratio of m-chloroperbenzoic acid to non-aromatic double bonds of diene units | Ratio of water to non-aromatic double bonds of diene units | Weight-average molecular weight, g/mol | 5% weight loss temperature, °C. | Styrene content, wt. % | Content of 1,2-butadiene units, wt. % | Content of 1,4-butadiene units, wt. % | Bromine content, wt. % | OH-group content, wt. % | Epoxy group content, wt. % |
|---|---|---|---|---|---|---|---|---|---|---|---|
| Example 1 | 1:1 | is absent | 3.4:1 | 109 500 | 220 | 20.69 | — | — | 77.23 | 1.56 | 0.53 |
| Example 2 | 0.9985:1 | 0.0015:1 | is absent | 92 500 | 200 | 20.2 | — | — | 79.8 | 0.15 | — |
| Example 3 | 0.95:1 | 0.05:1 | is absent | 238 000 | 215 | 20.53 | 0.53 | 1.33 | 73.6 | — | 4.01 |
| Example 4 | 1:1 | is absent | 2.3:1 | 110 000 | 222 | 21.67 | — | — | 76.00 | 1.13 | 1.19 |
| Example 5 | 1:1 | is absent | is absent | 310 000 | 190 | 20.79 | — | — | 79.21 | — | — |

Example 6. Preparation of Expandable Polystyrene 87 parts of water and 0.43 parts of a polymerization stabilizer (a mixture of sodium pyrophosphate and magnesium sulfate) were mixed in a flask at a temperature of 25° C. A mixture of 100 parts of styrene, 0.46 parts of a mixture of polymerization initiators (benzoylperoxide and tert-butyl perbenzoate), 0.62 part of a flame retardant prepared according to examples 1 to 5, and 0.21 parts of a flame retardant synergist (dicumyl peroxide) were added to this mixture with stirring. The mixture was stirred for 2 hours at a temperature of up to 85° C. and then heated to 115° C. for 4.5 hours. 70 minutes after the temperature in the flask reached 80° C., a 10% aqueous solution of polyvinylpyrrolidone was added to the reaction mixture. After additional 100-120 minutes, a solution of 0.10 parts of a chain transfer agent in 4.7 parts of a foaming reagent (n-heptane) was added to the reaction mass—a step of expanding polystyrene. After reaching 115° C., the flask was kept at a constant temperature for 3 hours, after which the mixture was cooled to a temperature of 25° C. for 3 hours.

Then, the particle size distribution of the polystyrene obtained before the step of its expanding was determined. The results of the measurements of particle-size distribution are given in Table 2.

desired parameters: heat resistance at temperatures over 200° C. and the content of bromine more than 65 wt. %, and has good compatibility with polystyrene. The introduction of the copolymers according to Examples 1 and 4 into polystyrene gives a stable suspension, and the formed polystyrene granules have a desired size, fully meeting the requirements of TT 2214-019-53505711-2010 (Table 2); the yield of the target fractions is 89%.

The data of Example 2 (Table 1) show that the resulting modified styrene-butadiene copolymer comprising hydroxyl groups and bromine atoms is characterized by a high bromine content and good compatibility with polystyrene (Table 2), which is confirmed by a yield of target fractions of approximately 89%; however, this copolymer does not exhibit a desired heat resistance.

The data of Example 3 (Table 1) show that the resulting modified styrene-butadiene copolymer comprising only epoxy groups and halogen atoms is characterized by a high heat resistance and a high bromine content; however, its compatibility with polystyrene is deteriorated, and it has a negative effect on the yield of target fractions (particle size distribution does not meet the requirements of TT 2214-019-53505711-2010), as evidenced by the yield of target fractions, which is 84%. The data of Example 5 (Table 1) show that the process in the absence of water in the

TABLE 2

Particle-size distribution of polystyrene comprising a flame retardant in accordance with TT 2214-019-53505711-2010 and the inflammability class of polystyrene according to Item 7 of Article 13 of "Technical regulations of fire safety requirements"

| Sieve, No. | Example 6 Used flame retardant (according to Example) | | | | |
|---|---|---|---|---|---|
| | Example 1 | Example 2 | Example 3 | Example 4 | Example 5 |
| 2.00 | 0.08 | 0.06 | 8.55 | 1.57 | 1.30 |
| 1.60 | 1.85 | 1.15 | 5.61 | 1.62 | 2.51 |
| 1.00 | 62.27 | 40.75 | 49.39 | 55.21 | 21.57 |
| 0.70 | 27.59 | 47.48 | 29.2 | 32.1 | 47.52 |
| 0.40 | 6.51 | 9.11 | 6.3 | 7.3 | 25.30 |
| 0.2 | 2.54 | 1.26 | — | 1.45 | — |
| bottom | 0.16 | 0.19 | 0.95 | 0.75 | 1.80 |
| Sum of target fractions (1.60 + 1.00 + 0.70) | 91.71 | 89.38 | 84.2 | 92.6 | 71.6 |
| Inflammability class according to TT 2214-019-53505711-2010 | B2 | — | — | B2 | — |

As can be seen from the data given in Table 1, the combined use of water, bromine and butanol (Example 1 and Example 4) makes it possible to obtain a modified styrene-butadiene copolymer that simultaneously comprises epoxy groups, hydroxyl groups, and bromine atoms and exhibits modifying system results in a modified styrene-butadiene copolymer that comprises only bromine atoms; the resulting copolymer is characterized by a low heat resistance, and has a negative effect on the process of polymerization and the formation of polystyrene granules (Table 2), which is confirmed by the yield of the target fractions, which is only 72% (the particle-size distribution does not satisfy the requirements of TT 2214-019-53505711-2010).

The data on the particle-size distribution for polystyrene (Table 2) show that the modified diene-containing (co) polymer obtained in accordance with the present invention, comprising epoxy groups, hydroxyl groups and bromine atoms, unlike hydroxybrominated and epoxybrominated copolymers, does not affect the process of polymerization and the formation of polystyrene granules, as evidenced by a high yield of target fractions (more than 89%). The introduction of the copolymers according to the invention into polystyrene ensures a stable suspension, and the formed granules have a desired size fully satisfying TT 2214-019-53505711-2010.

As can be seen from the data in Table 2, polystyrene containing the flame retardant according to the present invention (Example 1) provides expandable polystyrene with flame retardant properties comparable to those provided by HBCD, which is also confirmed by the flame resistance tests, which allowed the expandable polystyrene containing the flame retardant according to the present invention to be classified to moderately flammable materials of the inflammability class B2 (according to Item 7 of Article 13 of "Technical regulations of fire safety requirements" (Federal Act of 22.07.2008, No. 123, in the edition of 29.07.2017)).

The invention claimed is:

1. A modified diene-containing (co)polymer comprising in its structure halogen atoms, at least one epoxy group, and at least one hydroxyl group, having a 5% weight loss temperature of at least 180° C., a weight-average molecular weight of at least 1500 g/mol, a halogen content of at least 35 wt. % based on the total weight of the (co)polymer,
wherein the halogen atoms, the at least one epoxy group, and the at least one hydroxyl group are bonded to a straight-chain hydrocarbon portion of the (co)polymer, derived from a diene.

2. The modified diene-containing (co)polymer according to claim 1, having a 5% weight loss temperature of at least 200° C.

3. The modified diene-containing (co)polymer according to claim 1, having a weight-average molecular weight of from 2000 to 280000 g/mol.

4. The modified diene-containing (co)polymer according to claim 1, wherein the content of the halogen atoms is at least 60 wt. %, based on the total weight of the (co)polymer.

5. The modified diene-containing (co)polymer according to claim 1, wherein the content of the epoxy groups is from 0.01 to 5 wt. % based on the total weight of (co)polymer.

6. The modified diene-containing (co)polymer according to claim 5, wherein the content of the epoxy groups is from 0.05 to 3 wt. % based on the total weight of (co)polymer.

7. The modified diene-containing (co)polymer according to claim 5, wherein the content of the epoxy groups is from 1 to 2 wt. % based on the total weight of (co)polymer.

8. The modified diene-containing (co)polymer according to claim 1, wherein the content of the hydroxyl groups is from 0.05 to 5 wt. % based on the total weight of (co) polymer.

9. The modified diene-containing (co)polymer according to claim 8, wherein the content of the hydroxyl groups is from 0.1 to 3 wt. % based on the total weight of (co)polymer.

10. The modified diene-containing (co)polymer according to claim 8, wherein the content of the hydroxyl groups is from 0.15 to 1 wt. % based on the total weight of (co) polymer.

11. The modified diene-containing (co polymer according to claim 1, wherein the (co)polymer is a modified butadiene (co)polymer, a modified butadiene-styrene (co)polymer, or a modified butadiene-styrene-isoprene (co)polymer.

12. The modified diene-containing (co)polymer according to claim 11, wherein the (co)polymer is a modified butadiene-styrene (co)polymer.

13. A method for preparing the modified diene-containing copolymer of claim 1, comprising:
a) dissolution, wherein a starting diene-containing (co) polymer is dissolved in an organic solvent;
b) modification, wherein the modification is carried out by adding components of a modifying system to the solution of the starting diene-containing (co)polymer in the organic solvent, obtained in step (a);
c) neutralization and separation, wherein an aqueous solution of a neutralizing agent is added to a reaction mass obtained in step (b), followed by separating an aqueous layer and an organic layer;
d) precipitation, wherein the modified diene-containing (co)polymer is precipitated by adding an excess of an alcohol-precipitant to the organic layer to obtain a precipitated modified diene-containing (co)polymer; and
e) isolation, wherein the precipitated modified diene-containing (co)polymer is filtered and then dried,
characterized by using, as the modifying system in modification step (b), a mixture of halogen and water in a ratio of halogen to water of from 1:0.01 to 1:1 in the presence of an aliphatic alcohol.

14. The method according to claim 13, characterized in that the ratio of the halogen to water in the modifying system is from 1:0.5 to 1:0.7.

15. The method according to claim 13, characterized in that the ratio of the halogen to water in the modifying system is from 1:0.25 to 1:0.7.

16. The method according to claim 13, characterized in that chlorine, bromine, or iodine is used as the halogen in the modifying system.

17. The method according to claim 16, characterized in that bromine is used as the halogen in the modifying system.

18. The method according to claim 17, characterized in that bromine in the modifying system is used as bromine as such or in the form of a solution with a bromine content of at most 70 wt. %.

19. The method according to claim 13, characterized in that water in the modifying system is distilled, deionized, demineralized, osmotic, or bidistilled water.

20. The method according to claim 13, characterized in that the starting diene-containing (co)polymer is conjugated diene polymer or copolymer.

21. The method according to claim 20, characterized in that the conjugated diene is a conjugated diene selected from the group of: 1,3-butadiene, 2-methyl-1,3-butadiene (isoprene), 2-ethyl-1,3-butadiene, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, 2-methyl-pentadiene, 4-methyl-pentadiene, or a mixture thereof.

22. The method according to claim 21, characterized in that the conjugated diene is 1,3-butadiene or isoprene.

23. The method according to claim 20, characterized in that vinyl aromatic compounds are used as a comonomer in the starting diene-containing (co)polymer, wherein the vinyl aromatic compounds are selected from the group of: styrene, α-methyl styrene, ortho-, meta-and para-methyl styrene, 3-vinyl toluene, ethylvinyl benzene, 4-cyclohexyl styrene, para-tert-butyl styrene, methoxystyrene, vinyl mesitylene, divinyl benzene, 1-vinyl naphthalene, 2,4,6-trimethyl styrene, or mixtures thereof.

24. The method according to claim 23, characterized in that styrene or α-methyl styrene is used as a comonomer in the starting diene-containing (co)polymer.

25. The method according to claim 13, characterized in that the starting diene-containing (co)polymer is a butadiene (co)polymer, a butadiene-styrene (co)polymer, or a butadiene-styrene-isoprene (co)polymer.

26. The method according to claim 25, characterized in that the starting diene-containing (co)polymer is a butadiene-styrene (co)polymer.

27. The method according to claim 13, characterized in that the starting diene-containing (co polymer has a weight-average molecular weight of at least 700 g/mol.

28. The method according to claim 13, characterized in that the starting diene-containing (co)polymer has a polydispersity index of 0.8 to 3.

29. The method according to claim 13, characterized in that the content of 1,2 units in the starting diene-containing (co)polymer is from at least 10 to 100 wt. %, based on the polybutadiene part of the (co)polymer.

30. The method according to claim 13, wherein the organic solvent is an ether, a halogenated saturated aliphatic hydrocarbon, a cycloaliphatic hydrocarbon, an aromatic hydrocarbon, or a halogenated aromatic hydrocarbon.

31. The method according to claim 30, wherein the organic solvent is tetrahydrofuran, chloroform, dichloromethane, dichloroethane, cyclohexane, or toluene.

32. The method according to claim 31, wherein the organic solvent is tetrahydrofuran, chloroform, or dichloromethane.

33. The method according to claim 13, characterized in that the dissolution in step (a) is carried out at a temperature of from 10 to 50° C.

34. The method according to claim 13, characterized in that the weight ratio of the organic solvent to the starting diene-containing (co)polymer is from 5:1 to 30:1.

35. The method according to claim 13, characterized in that the time of the dissolution process is at most 60 min.

36. The method according to claim 13, characterized in that the starting diene-containing (co)polymer is pre-ground.

37. The method according to claim 13, characterized in that methanol, ethanol, propanol, isopropanol, butanol, isobutanol, pentanol, or hexanol is used as the aliphatic alcohol in the modification step.

38. The method according to claim 37, characterized in that propanol, butanol, isobutanol, or pentanol is used as the aliphatic alcohol in the modification step.

39. The method according to claim 37, characterized in that butanol, isobutanol, or pentanol is used as the aliphatic alcohol in the modification step.

40. The method according to claim 13, characterized in that the ratio of the starting diene-containing (co)polymer to the modifying system to the aliphatic alcohol is from 1:1.5:3 to 1:5:3.

41. The method according to claim 13, characterized in that the modification is carried out at a temperature of from 0 to 50° C.

42. The method according to claim 13, characterized in that the rate of stirring the reaction mass after addition of the modifying system in the modification step is from 50 to 600 rpm.

43. The method according to claim 13, characterized in that the time of the modification step is at least 15 min.

44. The method according to claim 13, characterized in that the neutralizing agent in the neutralization step is an aqueous solution of sodium hydroxide, sodium thiosulfate, sodium bisulfite, or sodium carbonate.

45. The method according to claim 13, characterized in that the molar ratio of the neutralizing agent to the added halogen is from 1:1 to 3:1.

46. The method according to claim 13, characterized in that the neutralization process is carried out at a temperature of from 15 to 50° C.

47. The method according to claim 13, characterized in that methanol, ethanol, propanol, isopropanol, butanol, or isobutanol is used as the alcohol-precipitant in the precipitation step.

48. The method according to claim 13, characterized in that the molar ratio of the alcohol-precipitant to the modified diene-containing (co)polymer is from 15:1 to 1:1.

49. The method according to claim 13, characterized in that the filtration of the modified diene-containing (co)polymer is carried out using porous membrane filters, or nutsch filters.

50. The method according to claim 13, characterized in that the filtration of the modified diene-containing (co)polymer is carried out at a temperature of from 20 to 40° C.

51. The method according to claim 13, characterized in that the drying of the modified diene-containing (co)polymer is carried out at a temperature of from 50 to 105° C.

52. The method according to claim 13, characterized in that the modified diene-containing (co)polymer is dried at a pressure of from 1 to 20 kPa.

53. A method of providing flame retardant properties to a polymer or polymer composition, the method comprising adding the modified diene-containing (co)polymer according to claim 1 in a step of preparation of the polymer or polymer composition to provide said flame retardant properties.

54. The method according to claim 53, characterized in that the polymer or polymer composition is an expandable polystyrene.

55. An expandable polystyrene comprising the modified diene-containing (co)polymer according to claim 1 as a flame retardant.

56. The expandable polystyrene according to claim 55, wherein the content of the modified diene-containing (co) polymer is at least 0.5 weight parts per 100 weight parts of the expandable polystyrene.

57. A polymer composition based on an expandable polystyrene, comprising the modified diene-containing (co) polymer according to claim 1 as a flame retardant and additives.

58. A polymer composition according to claim 57, wherein antistatics, stabilizers, dyes, lubricants, fillers, adhesion reducing agents are used as additives.

* * * * *